(12) United States Patent
Zhu et al.

(10) Patent No.: US 12,278,663 B2
(45) Date of Patent: Apr. 15, 2025

(54) OPTICAL MODULE AND PARAMETER TRANSMISSION METHOD, DETECTION METHOD, CONTROL METHOD THEREOF, AND FRONTHAUL SYSTEM

(71) Applicant: ZTE CORPORATION, Guangdong (CN)

(72) Inventors: Nengnian Zhu, Guangdong (CN); Yun Zhang, Guangdong (CN); Zhan Su, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 76 days.

(21) Appl. No.: 17/919,572

(22) PCT Filed: Apr. 20, 2021

(86) PCT No.: PCT/CN2021/088298
§ 371 (c)(1),
(2) Date: Oct. 18, 2022

(87) PCT Pub. No.: WO2021/213360
PCT Pub. Date: Oct. 28, 2021

(65) Prior Publication Data
US 2023/0155676 A1    May 18, 2023

(30) Foreign Application Priority Data

Apr. 21, 2020   (CN) .......................... 202010317367.1

(51) Int. Cl.
*H04B 10/077*    (2013.01)
*G01M 11/00*    (2006.01)
(Continued)

(52) U.S. Cl.
CPC .......... *H04B 10/0775* (2013.01); *G01M 11/00* (2013.01); *G06F 12/1054* (2013.01); *H04B 10/25752* (2013.01); *H04J 3/1694* (2013.01)

(58) Field of Classification Search
CPC .......... H04B 10/0775; H04B 10/25752; H04B 10/0779; H04B 2210/075; H04B 10/0795; G06F 12/1054; H04J 3/1694; G01M 11/00
(Continued)

(56) References Cited

U.S. PATENT DOCUMENTS 6,526,370 B1 * 2/2003 Yu .......................... H04L 43/00
                                                      702/182
9,787,395 B2 * 10/2017 Chung ............. H04B 10/50572
(Continued)

FOREIGN PATENT DOCUMENTS

CN       1939020 A  *  3/2007  ....... H04L 25/03019
CN     101047451 A  * 10/2007  ............ H04J 3/1694
(Continued)

OTHER PUBLICATIONS

China Patent Office, First Office Action issued Jul. 15, 2024 for application No. CN202010317367.1.
(Continued)

*Primary Examiner* — Abbas H Alagheband
(74) *Attorney, Agent, or Firm* — Li & Cai Intellectual Property (USA) Office (57) ABSTRACT

The present application provides an optical module and parameter transmission method, detection method, control method thereof, and a fronthaul system. The parameter transmission method includes: generating, in response to at least one of a plurality of registers of a far-end optical module becoming a first source register, an uplink optical signal according to ID information and a register value of the
(Continued)

first source register, where the first source register is a register having a changed register value of the plurality of registers, and register values of the registers have a mapping relationship with performance parameters of the far-end optical module; and transmitting the uplink optical signal to a near-end optical module of a near-end node.

13 Claims, 9 Drawing Sheets

(51) Int. Cl.
  *G06F 12/1045* (2016.01)
  *H04B 10/2575* (2013.01)
  *H04J 3/16* (2006.01)

(58) Field of Classification Search
  USPC .......................................................... 398/16
  See application file for complete search history.

(56) References Cited

U.S. PATENT DOCUMENTS

| | | | | |
|---|---|---|---|---|
| 2013/0136445 A1* | 5/2013 | El-Ahmadi | ............ | H04B 10/07 398/25 |
| 2013/0177308 A1* | 7/2013 | Rope | .................. | H04B 10/0799 398/25 |
| 2016/0191152 A1* | 6/2016 | Soto | ..................... | H04J 14/0252 398/16 |
| 2016/0352419 A1* | 12/2016 | Fonseka | ................. | H04L 1/0065 |
| 2018/0357180 A1* | 12/2018 | Grant | .................. | G06F 12/1054 |
| 2023/0189160 A1* | 6/2023 | Korpi | .................. | H04W 52/146 455/522 |

FOREIGN PATENT DOCUMENTS

| | | | | | |
|---|---|---|---|---|---|
| CN | 102916776 | A | | 2/2013 | |
| CN | 103152101 | A | | 6/2013 | |
| CN | 108494496 | A | | 9/2018 | |
| CN | 110430006 | A | | 11/2019 | |
| CN | 111126594 | A | * | 5/2020 | ............... G06N 3/08 |
| CN | 117278125 | A | * | 12/2023 | ......... H04B 10/0775 |
| JP | H0643860 | A | * | 2/1994 | |
| TW | I609575 | B | | 12/2017 | |
| WO | WO-2017024802 | A1 | * | 2/2017 | ............... G06F 3/06 |
| WO | WO-2017041224 | A1 | * | 3/2017 | ............ G01M 11/00 |

OTHER PUBLICATIONS

European Patent Office, The extended European search report issued Aug. 29, 2023 for application No. EP21792752.4.
WIPO, International Search Report issued on Jul. 9, 2021.

* cited by examiner

OPTICAL MODULE AND PARAMETER TRANSMISSION METHOD, DETECTION METHOD, CONTROL METHOD THEREOF, AND FRONTHAUL SYSTEM

TECHNICAL FIELD

The present disclosure relates to, but is not limited to, the field of communication technology.

BACKGROUND

The distributed base station system adopts a design in which a building baseband unit (BBU) and a radio remote unit (RRU) are separated. In a 5G radio access network (RAN) architecture, the two-stage structure composed of BBU and RRU is further evolved into a three-stage structure composed of a centralized unit (CU), a distributed unit (DU), and an active antenna unit (AAU). The BBU and the RRU in the two-stage structure, or the CU, the DU and the AAU in the three-stage structure are connected through optical fibers.

SUMMARY

The present disclosure provides a method for transmitting performance parameters of an optical module of a far-end node, a detection method for detecting performance of an optical module of a far-end node, a method for transmitting control parameters for controlling an optical module of a far-end node, a method for controlling an optical module of a far-end node, and a fronthaul system.

As a first aspect of the present disclosure, there is provided a method for transmitting performance parameters of a far-end optical module of a far-end node, including: generating, when at least one of a plurality of registers of the far-end optical module becomes a first source register, an uplink optical signal according to ID information and a register value of the first source register, wherein the first source register is a register having a changed register value of the plurality of registers, and register values of the plurality of registers have a mapping relationship with performance parameters of the far-end optical module; and transmitting the uplink optical signal to a near-end optical module of a near-end node.

As a second aspect of the present disclosure, there is provided a detection method for detecting performance of a far-end optical module of a far-end node, including: modifying, according to a received predetermined uplink optical signal, a register value of a corresponding mapping register in a mapping register set of a near-end optical module of a near-end node, wherein the predetermined uplink optical signal is an uplink optical signal sent from the far-end optical module of the far-end node according to the method for transmitting performance parameters of the first aspect of the present disclosure, the mapping register set includes a plurality of mapping registers, and the plurality of mapping registers are in one-to-one correspondence with the plurality of registers of the far-end optical module; and determining, according to the modified register value of the mapping register, a running state of the far-end optical module.

As a third aspect of the present disclosure, there is provided a method for transmitting control parameters for controlling a far-end optical module of a far-end node, including: generating, when at least one mapping register in a mapping register set of a near-end optical module of a near-end node becomes a second source register, a downlink optical signal according to ID information and a register value of the second source register, wherein a plurality of mapping registers in the mapping register set are in one-to-one correspondence with a plurality of registers in the far-end optical module of the far-end node, the second source register is a mapping register having a changed register value of the plurality of mapping registers, and register values of the mapping registers have a mapping relationship with control parameters of the far-end optical module; and transmitting the downlink optical signal to the far-end optical module.

As a fourth aspect of the present disclosure, there is provided a method for controlling a far-end optical module of a far-end node, including: modifying, according to a received predetermined downlink optical signal, a register value of a corresponding register in the far-end optical module, wherein the predetermined downlink optical signal is a downlink optical signal sent from a near-end optical module of a near-end node according to the method for transmitting control parameters of the third aspect of the present disclosure, and register values of the registers of the far-end optical module have a mapping relationship with control parameters of the far-end optical module.

As a fifth aspect of the present disclosure, there is provided a far-end optical module, including: a plurality of registers configured to store respective performance parameters of the far-end optical module; a far-end signal processing unit configured to generate, when at least one of the plurality of registers becomes a first source register, an uplink optical signal according to ID information and a register value of the first source register, wherein the first source register is a register having a changed register value of the plurality of registers; and a far-end signal transmission unit configured to transmit the uplink optical signal to a near-end optical module of a near-end node.

As a sixth aspect of the present disclosure, there is provided a near-end optical module, including: a plurality of mapping registers in one-to-one correspondence with a plurality of registers of a far-end optical module; a near-end signal processing unit configured to modify, according to a received predetermined uplink optical signal, a register value of a corresponding mapping register of a near-end optical module of a near-end node, wherein the predetermined uplink optical signal is an uplink optical signal sent from the far-end optical module of the far-end node according to the method for transmitting performance parameters of the first aspect of the present disclosure; and a near-end judgement unit configured to determine, according to the modified register value of the mapping register, a running state of the far-end optical module.

As a seventh aspect of the present disclosure, there is provided a fronthaul system including a near-end node and a far-end node, wherein the near-end node includes the near-end optical module according to the sixth aspect of the present disclosure, and the far-end node includes the far-end optical module according to the fifth aspect of the present disclosure.

BRIEF DESCRIPTION OF DRAWINGS

Accompanying drawings are provided for further understanding of this disclosure and constitute a part of the specification. Hereinafter, these drawings are intended to explain the disclosure together with the following specific implementations, but should not be considered as a limitation to the present disclosure. In the drawings.

DETAIL DESCRIPTION OF EMBODIMENTS

Hereinafter, specific implementations of the present disclosure will be described with respect to the accompanying drawings. It will be appreciated that the specific implementations as set forth herein are merely for the purpose of illustration and explanation of the present disclosure and should not be constructed as a limitation thereof.

In a 4G distributed base station system, the BBU is typically configured in a primary base station or a central office (CO) machine room, while the RRU is placed remotely at an antenna end through an optical fiber, where a fronthaul system is provided between the BBU and the RRU. In a 5G network architecture, the CU and the DU are deployed in the primary base station or CO machine room in a combined manner, the AAU are deployed in different stations in a distributed manner, and the DU and the AAU are connected via an enhanced common public radio interface (eCPRI) to form the fronthaul system. It has been found that in an existing fronthaul system, the RRU or the AAU is placed remotely through an optical fiber, and an optical module at the RRU side or the AAU side lacks a remote monitoring means. When a failure occurs in the fronthaul system, manual maintenance is performed to determine whether the optical module at the RRU side or the AAU side fails. Therefore, the performance of the optical module at the RRU side or the AAU side cannot be predicted, and under the condition of performance degradation of the optical module, the optical module cannot be replaced in time, and service failure of the fronthaul system caused by failure of the optical module at the RRU side or the AAU side cannot be actively avoided.

The optical module is an optoelectronic device with a limited service life that performs optical-to-electrical and electrical-to-optical conversions. In general, the service life of an optical module is about 5 years. During use, the performance of the optical module may gradually deteriorate as the operation time increases. For example, as the operation time increases, the quantum efficiency of a laser emitting laser in the optical module may decrease, causing performance deterioration of the optical module. In addition, the optical module may fail due to influence of the environment. For example, contamination and damage of an optical interface of the optical module may cause an increased optical link loss, making the optical link blocked; and dry environment or improper operation may cause the optical module to be damaged by electrostatic discharge (ESD), which may further cause performance changes or failure of the optical module.

In the optical module, performance parameters characterizing performance of the optical module are stored in registers of the optical module. It should be noted that the register is a small storage area for storing data in the optical module, and is a high-speed storage component with a limited storage capacity. Each optical module includes a plurality of registers that store corresponding data according to different functions. In the present disclosure, the optical module includes a plurality of registers configured to store performance parameters of the optical module, and store different performance parameters, respectively. It should be noted that the performance parameters in the registers of the optical module are dynamically changed within a certain range. For example, the laser bias current is an important performance parameter of the optical module, while the electronic-to-optical conversion efficiency of the laser in the optical module is inversely related to changes in the ambient temperature. Therefore, to ensure that an output optical power of the laser does not change with the temperature, the laser bias current is increased at a higher temperature, and decreased at a lower temperature, and changes in the laser bias current are reflected in real time as changes in a value of a register corresponding to the laser bias current. For example, the received optical power is another important performance parameter of the optical module, and as the on-line operation time of the optical module increases, a wavelength of the laser may shift. Meanwhile, the optical module is used in cooperation with a multiplexer (MUX) or a DEMultiplexer (DEMUX) so that when a wavelength shift of the laser exceeds a passband of the MUX/DEMUX at that wavelength, the received optical power may gradually decrease, and changes in the received optical power may also be reflected in real time as changes in the value of the register corresponding to the received optical power. It should be further noted that when the performance of the optical module changes, underlayer software inside the optical module modifies a value of the register corresponding to the performance parameter of the optical module in real time.

It has been found that monitoring performance of the optical module at a far-end node (e.g., RRU or AAU) of a fronthaul system is mainly implemented by monitoring performance parameters stored in the registers of the far-end optical module; and remote monitoring of the far-end optical module can be implemented if remote monitoring of the performance parameters stored in the registers of the far-end optical module can be implemented.

In view of this, the present disclosure proposes the concept that in a near-end optical module of a near-end node (e.g., BBU or DU) in a fronthaul system, a mapping register set is further provided in the near-end optical module in addition to the conventional registers. The mapping register set includes a plurality of mapping registers in one-to-one correspondence with a plurality of registers in the far-end optical module of the far-end node, and the corresponding mapping register and register of the far-end optical module are set to have a same register value. Therefore, when the register value of any of the registers storing the performance parameters of the far-end optical module in the far-end optical module changes, performance of the optical module of the far-end node can be monitored at a near-end node if the register value of the corresponding mapping register in the near-end optical module can be synchronously modified.

Figure 1:
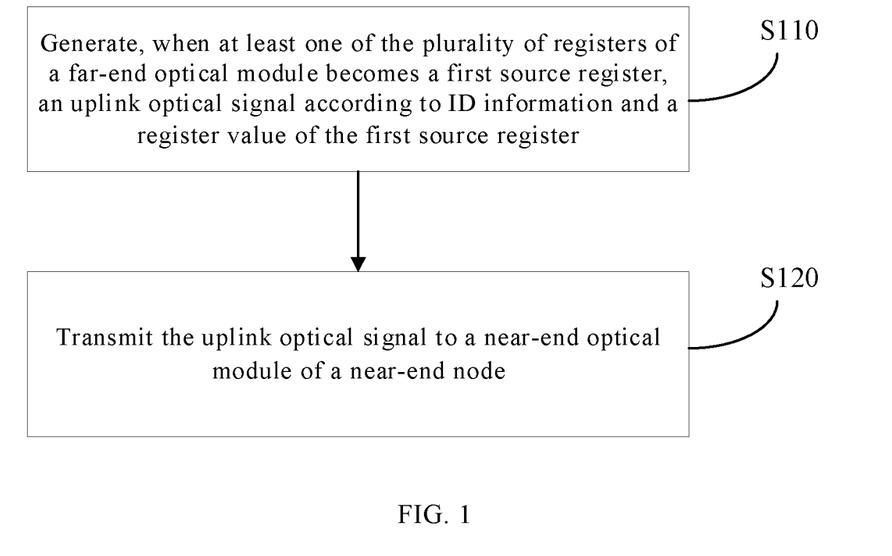
FIG. 1 is a flowchart of an implementation of a method for transmitting performance parameters according to the present disclosure.

In view of this, as a first aspect of the present disclosure, there is provided a method for transmitting performance parameters of a far-end optical module of a far-end node. As shown in FIG. 1, the method for transmitting performance parameters may include operations S110 to S120.

At operation S110, when at least one of a plurality of registers of the far-end optical module becomes a first source register, an uplink optical signal is generated according to ID information and a register value of the first source register. The first source register is a register having a changed register value of the plurality of registers, and register values of the registers have a mapping relationship with performance parameters of the far-end optical module.

At operation S120, the uplink optical signal is transmitted to a near-end optical module of a near-end node.

The method for transmitting performance parameters is implemented by a far-end node. In order to synchronously modify the register value of the mapping register of the near-end optical module, in operation S110 of the method for transmitting performance parameters, for convenience of description, the register having a changed register value of the plurality of registers of the far-end optical module is referred to as a first source register, and when at least one of the plurality of registers of the far-end optical module becomes the first source register, an uplink optical signal is generated according to ID information and a register value of the first source register. At operation S120, the uplink optical signal is transmitted to the near-end optical module of the near-end node to transmit the ID information and the register value of the first source register to the near-end node.

After receiving the uplink optical signal, the near-end node determines the ID information and the register value of the register carried in the uplink optical signal, determines, according to the ID information of the register, a mapping register corresponding to the first source register, and modifies a register value of the corresponding mapping register to the register value of the first source register.

Since register values of the registers of the far-end optical module have a mapping relationship with performance parameters of the far-end optical module, the near-end optical module can read the register value of a mapping register to determine the corresponding performance parameter of the far-end optical module. That is, with the above method for transmitting performance parameters, performance parameters of the far-end optical module of the far-end node can be acquired at the near-end node, the far-end optical module can be remotely detected at the near-end node, so that it can be determined in real time whether the optical module of the far-end node fails, which improves the failure discovery efficiency and reduces the labor cost.

It should be noted that the ID information of the register in the far-end optical module is not particularly limited in the present disclosure. For example, an address of the register in the far-end optical module may be used as the ID information of the register; or registers of the far-end optical module may be numbered, and the number of each register is used as the ID information of the register of the far-end optical module.

It should be noted that according to protocols, in a 4G fronthaul system, the direction from the BBU to the RRU is referred to as a downlink direction, and the direction from the RRU to the BBU is referred to as an uplink direction; and in a 5G fronthaul system, the direction from the DU to the AAU is referred to as a downlink direction, and the direction from the AAU to the DU is referred to as an uplink direction. Therefore, under the 4G network architecture, the far-end node of the fronthaul system is the RRU, and the near-end node is the BBU; and under the 5G network architecture, the far-end node of the fronthaul system is the AAU, and the near-end node is the CU or DU.

How to generate the uplink optical signal is not particularly limited in the present disclosure. For example, the uplink optical signal may be generated by loading an address of the first source register and the changed performance parameter of the far-end optical module stored in the first source register onto an uplink main signal of an optical module through subcarrier modulation; or by coupling an optical carrier signal carrying the ID information and the register value of the first source register with the main signal of the far-end optical module through wavelength division multiplexing (WDM).

Figure 2:
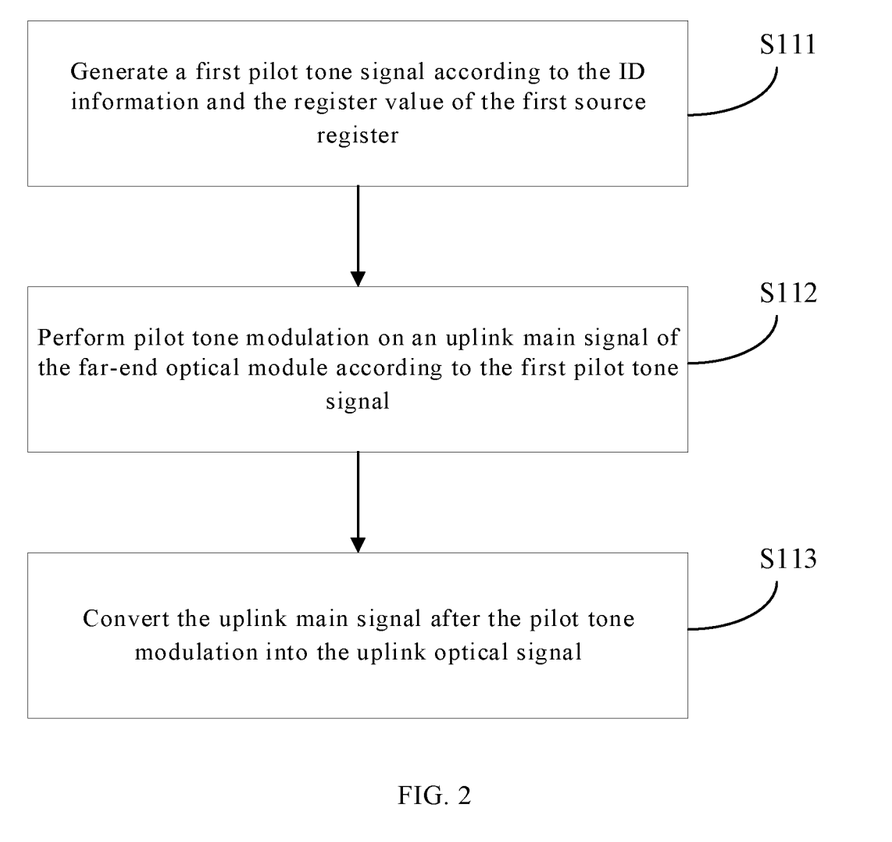
FIG. 2 is a flowchart of another implementation of a method for transmitting performance parameters according to the present disclosure.

As an optional implementation, the uplink optical signal may be generated by loading the ID information and the register value of the first source register onto the uplink main signal of the far-end optical module through the pilot tone technique. In addition, in the optical module, processing of information is all completed in the electrical domain, and when a signal is to be sent, the information is firstly processed to be loaded on an electrical signal, which is then converted into an optical signal before propagating over the optical fiber. Accordingly, as shown in FIG. 2, operation S110 may include operations S111 to S113.

At operation S111, a first pilot tone signal is generated according to the ID information and the register value of the first source register.

At operation S112, pilot tone modulation is performed on an uplink main signal of the far-end optical module according to the first pilot tone signal.

At operation S113, the uplink main signal after the pilot tone modulation is converted into the uplink optical signal.

Figure 3:
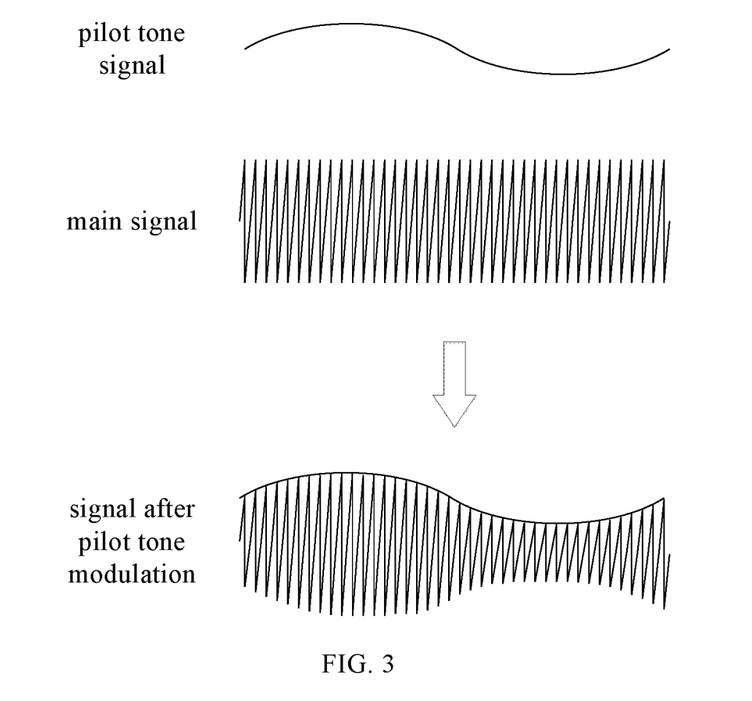
FIG. 3 is a schematic diagram showing the principle of pilot tone.

It should be noted that the pilot tone technique involves modulating a control signal to be transmitted onto a suitable carrier through waveform conversion as a pilot tone signal, and further superimposing the pilot tone signal onto a main signal. FIG. 3 shows the principle of the pilot tone. The modulated control signal is transmitted together with the main signal to a receiving end through a common transmitting device. The control signal may be obtained at the receiving end by means of a low-pass filter and a demodulator, while the main signal may be obtained by means of a high-pass filter. By means of the pilot tone signal, the optical transmission channel is saved, the service band is not occupied, and no additional specific wavelength is needed.

As an optional implementation, the pilot tone signal is loaded onto the main signal of the optical module in a subcarrier modulation manner, so as to implement pilot tone modulation on the uplink main signal of the far-end optical module.

The subcarrier modulation means that a signal to be transmitted is modulated and loaded onto a radio frequency electrical carrier, which is then modulated and loaded onto another carrier. In this implementation, the ID information and the register value of the first source register are modulated and loaded onto a radio frequency carrier to obtain the first pilot tone signal; and then, the first pilot tone signal is modulated and loaded onto the main signal of the optical module.

Figure 4:
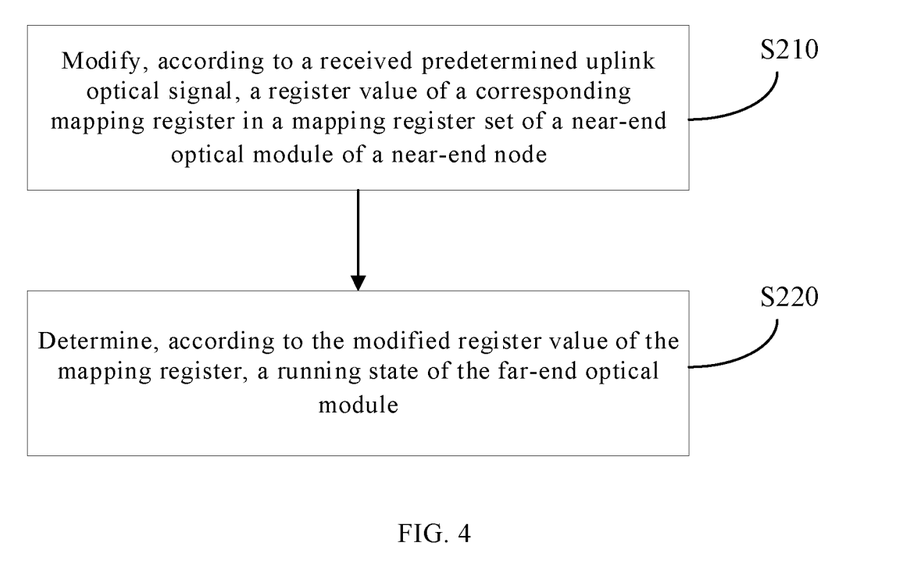
FIG. 4 is a flowchart of an implementation of a detection method according to the present disclosure.

As a second aspect of the present disclosure, there is provided a detection method for detecting performance of a far-end optical module of a far-end node. As shown in FIG. 4, the method for detecting performance may include operations S210 to S220.

At operation S210, a register value of a corresponding mapping register in a mapping register set of a near-end optical module of a near-end node is modified according to a received predetermined uplink optical signal. The predetermined uplink optical signal is an uplink optical signal sent from the far-end optical module of the far-end node according to the method for transmitting performance parameters of the first aspect of the present disclosure, the mapping register set includes a plurality of mapping registers, and the plurality of mapping registers are in one-to-one correspondence with the plurality of registers of the far-end optical module.

At operation S220, a running state of the far-end optical module is determined according to the modified register value of the mapping register.

The method for detecting performance according to the present disclosure is performed by the near-end node. As described above, in the present disclosure, a mapping register set is provided in a near-end optical module of a near-end node in a fronthaul system. The mapping register set includes a plurality of mapping registers, the plurality of mapping registers are in one-to-one correspondence with the registers in the far-end optical module, and the corresponding mapping register and register of the far-end optical module have a same register value. Therefore, when the register value of at least one register in the far-end optical module changes, the far-end optical module sends the register value and the ID information of the first source register to the near-end optical module in the form of an uplink optical signal. When the near-end optical module of the near-end node receives the uplink optical signal transmitted from the far-end optical module according to the method for transmitting performance parameters of the first aspect of the present disclosure, the register value of the mapping register in the near-end optical module is updated according to the received uplink optical signal. After the update, a mapping relationship is established again between register values of the mapping registers in the mapping register set of the near-end optical module and current performance parameters of the far-end optical module. To detect the performance of the optical module of the far-end node, in operation 220, a running state of the far-end optical module can be determined as long as the updated register value of each mapping register is read. The "running state" used herein includes, but is not limited to, whether the far-end optical module has a failure.

It should be noted that the plurality of mapping registers in one-to-one correspondence with the plurality of registers of the far-end optical module means that a mapping relationship is established between the plurality of mapping registers and the plurality of registers in the far-end optical module. One of two mutual mapped registers can locate the other through its own ID information. For example, in the far-end optical module, with the ID information of the mapping register in the near-end optical module, the register in the far-end optical module corresponding to the mapping register can be located, and vice versa.

Figure 5:
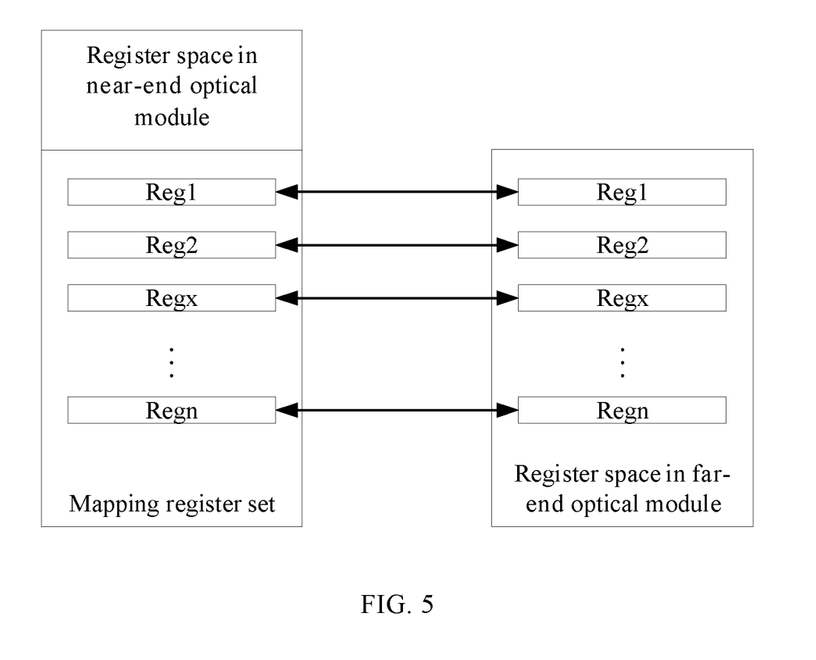
FIG. 5 is a schematic diagram showing register mapping according to the present disclosure.

FIG. 5 is a schematic diagram showing an implementation of a mapping relationship between mapping registers in a near-end optical module and registers in a far-end optical module. It should be further noted that as shown in FIG. 5, in addition to the registers in the mapping register set, the near-end optical module further includes registers that are normally used in an optical module, and configured to stores data such as performance parameters, authentication information, wavelength information, and the like of the optical module in the near-end node.

In the implementation shown in FIG. 5, each mapping register in the near-end optical module has the same the ID information as the register in the far-end optical module corresponding to the mapping register.

In the near-end optical module, the ID information of the mapping registers is Reg1, Reg2, Regx, . . . Regn, respectively. In the far-end optical module, the ID information of the registers is Reg1, Reg2, Regx, . . . Regn, respectively.

The mapping register with ID information Reg1 corresponds to the register with ID information Reg1 in the far-end optical module, the mapping register with ID information Reg2 corresponds to the register with ID information Reg2 in the far-end optical module, the mapping register with ID information Regx corresponds to the register with ID information Regx in the far-end optical module, . . . , and the mapping register with ID information Regn corresponds to the register with ID information Regn in the far-end optical module.

In the present disclosure, the mapping relationship between the mapping registers in the near-end optical module and the registers in the far-end optical module may be stored at the near-end node in the form of a mapping table.

According to the method for detecting performance of the far-end optical module of the far-end node of the present disclosure, after the ID information of a register and a register value of the register that can characterize performance of the optical module sent from the far-end optical module is received, the register value of a corresponding mapping register in a mapping register set of the near-end optical module is modified according to the ID information and the register value of the register, so that performance of the far-end optical module can be detected by reading the register value of the mapping register, and remote monitoring of the performance of the far-end optical module of the far-end node by the near-end node can be implemented.

Figure 6:
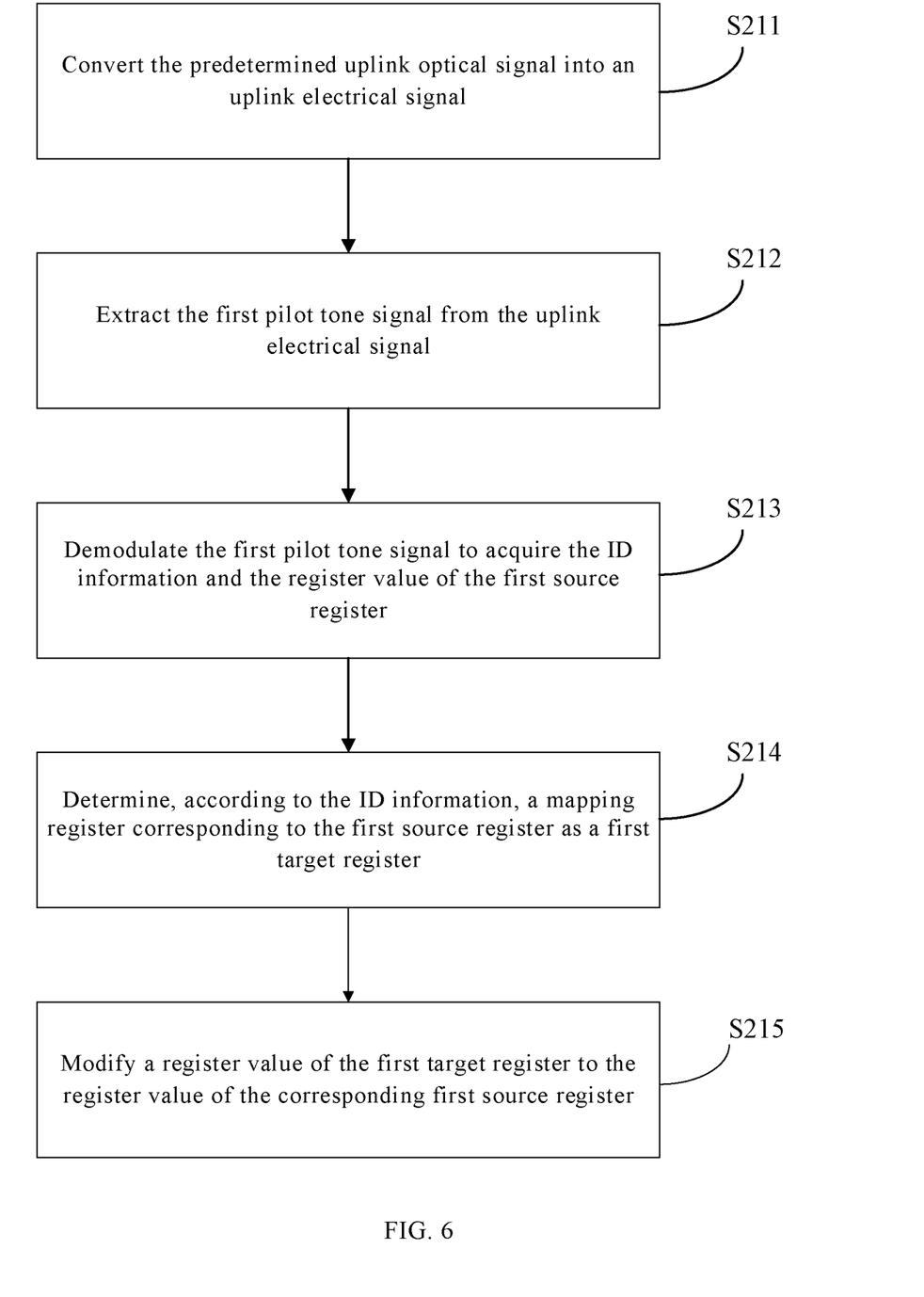
FIG. 6 is a flowchart of another implementation of a detection method according to the present disclosure.

As described above, in the optical module, processing of information is completed in the electrical domain. Therefore, when an optical signal is received, the optical signal needs to be converted into an electrical signal. Therefore, in the present disclosure, when the optical module of the near-end node receives the uplink optical signal transmitted from the optical module of the far-end node according to the method for transmitting performance parameters of the first aspect of the present disclosure, the uplink optical signal is desired to be converted into an uplink electrical signal firstly. In addition, when the uplink optical signal is generated through the pilot tone technique in the method for transmitting performance parameters according to the first aspect of the present disclosure, the near-end optical module is further desired to perform pilot tone demodulation on the uplink electrical signal, and further performs demodulation to obtain the ID information and the register value of the first source register. Accordingly, as shown in FIG. 6, operation S210 further includes operations S211 to S215.

At operation S211, the predetermined uplink optical signal is converted into an uplink electrical signal.

At operation S212, the first pilot tone signal is extracted from the uplink electrical signal.

At operation S213, the first pilot tone signal is demodulated to acquire the ID information and the register value of the first source register.

At operation S214, a mapping register corresponding to the first source register is determined according to the ID information as a first target register.

At operation S215, a register value of the first target register is modified to the register value of the corresponding first source register.

As described above, each optical module includes a plurality of registers that store corresponding data according to different functions. In the present disclosure, the optical module further includes a plurality of registers configured to store control parameters. The optical module executes corresponding operations according to the control parameters stored in the registers to realize corresponding functions. Therefore, control on functions of the optical module actually means control on the control parameters stored in the registers of the optical module. Remote control on the far-end optical module can be implemented if remote control on the control parameters stored in the registers of the far-end optical module can be implemented. When a service failure occurs in the fronthaul system, the far-end optical module can be controlled to perform a specific operation (for example, service loopback) to determine whether the service failure is caused by the far-end optical module.

Figure 7:
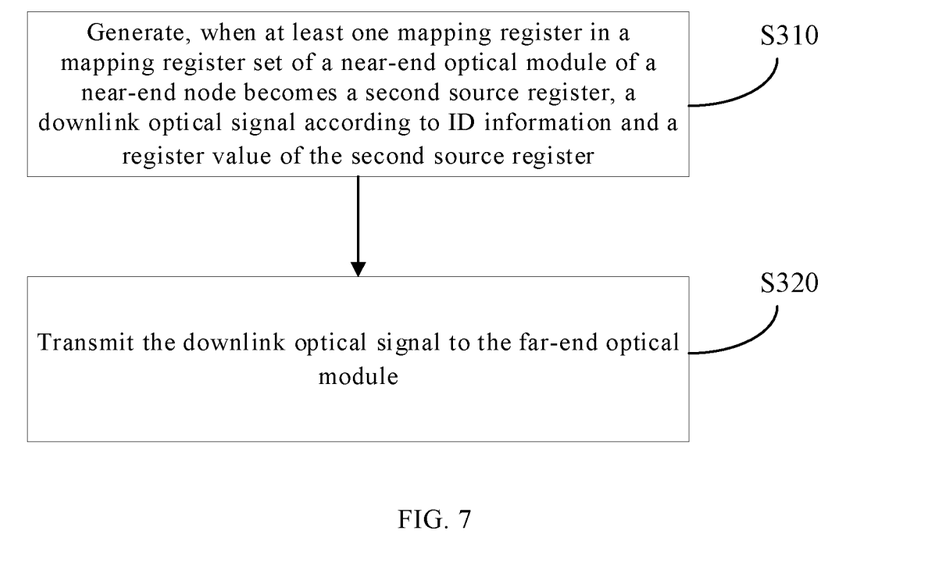
FIG. 7 is a flowchart of an implementation of a method for transmitting control parameters according to the present disclosure.

In view of this, as a third aspect of the present disclosure, there is provided a method for transmitting control parameters for controlling a far-end optical module of a far-end node. As shown in FIG. 7, the method for transmitting control parameters may include operations S310 and S320.

At operation S310, when at least one mapping register in a mapping register set of a near-end optical module of a near-end node becomes a second source register, a downlink optical signal is generated according to ID information and a register value of the second source register. A plurality of mapping registers in the mapping register set are in one-to-one correspondence with a plurality of registers in the far-end optical module of the far-end node, the second source register is a mapping register having a changed register value of the plurality of mapping registers, and register values of the mapping registers have a mapping relationship with control parameters of the far-end optical module.

At operation S320, the downlink optical signal is transmitted to the far-end optical module.

The method for transmitting control parameters is implemented by a near-end node. In the present disclosure, the plurality of registers of the far-end optical module include a plurality of registers storing control parameters of the far-end optical module. Accordingly, the mapping register set of the near-end optical module includes a plurality of mapping registers in one-to-one correspondence with the plurality of registers for storing control parameters of the far-end optical module. To control the far-end optical module to execute a specific operation, the register value of the corresponding mapping register in the near-end optical module is modified first, and then the modified register value of the mapping register is transmitted to the far-end optical module, so that the far-end optical module modifies the register value corresponding to the mapping register to the register value of the mapping register, and the far-end optical module executes the specific operation according to the modified register value.

In the present disclosure, how to modify the register value of the mapping register is not particularly limited. For example, the register value of the mapping register may be modified through an input device.

The one-to-one correspondence relationship between the plurality of mapping registers and the plurality of registers in the far-end optical module in operation S310 is the same as the one-to-one correspondence relationship between the plurality of mapping registers and the plurality of registers in the far-end optical module described in the second aspect of the present disclosure, and the ID information of the register has also been described in the foregoing, which are not described in detail here.

According to the method for transmitting control parameters for controlling a far-end optical module of a far-end node of the present disclosure, to have the far-end optical module execute a specific operation, the register value of the mapping register in the near-end optical module related to controlling the far-end optical module is modified and then transmitted to the far-end optical module together with the ID information of the mapping register, so that the far-end optical module can modify the register value corresponding to the mapping register to the register value of the mapping register, and execute the specific operation according to the modified register value, thereby implementing remote control on the far-end optical module through the near-end optical module.

Figure 8:
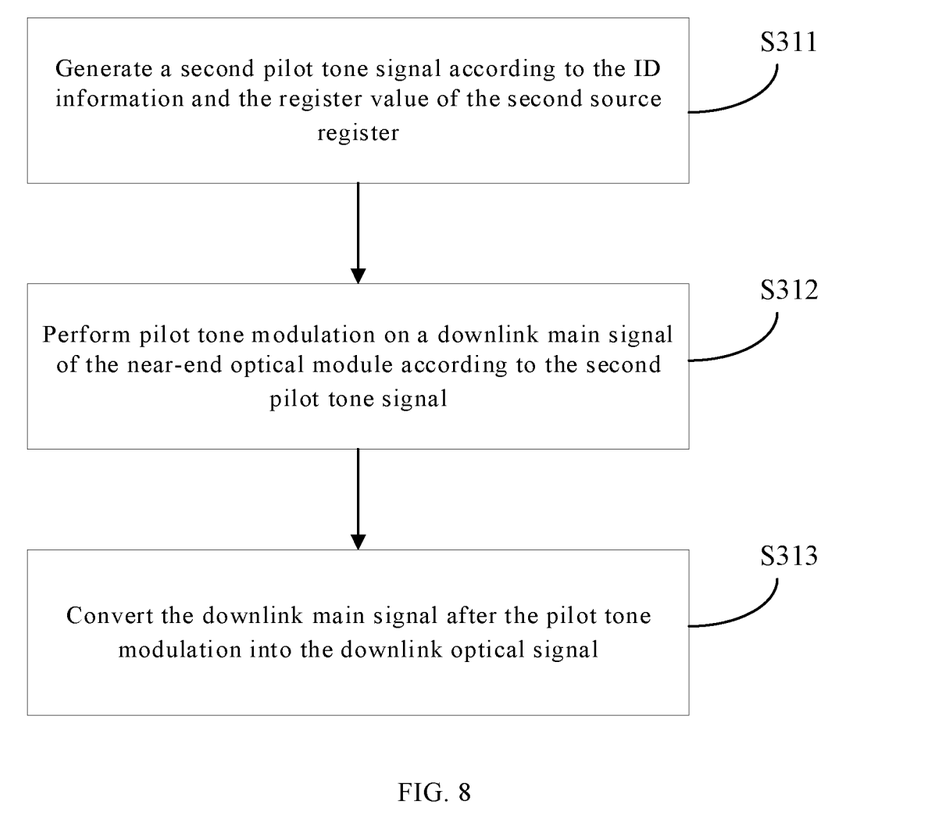
FIG. 8 is a flowchart of another implementation of a method for transmitting control parameters according to the present disclosure.

As an optional implementation, the downlink optical signal is generated through the pilot tone technique, the principle of which will not be described in detail here; and during generation of the downlink optical signal, the electrical signal also needs to be converted into an optical signal. Accordingly, as shown in FIG. 8, operation S310 further includes operations S311 to S313.

At operation S311, a second pilot tone signal is generated according to the ID information and the register value of the second source register.

At operation S312, pilot tone modulation is performed on a downlink main signal of the near-end optical module according to the second pilot tone signal.

At operation S313, the downlink main signal after the pilot tone modulation is converted into the downlink optical signal.

Figure 9:
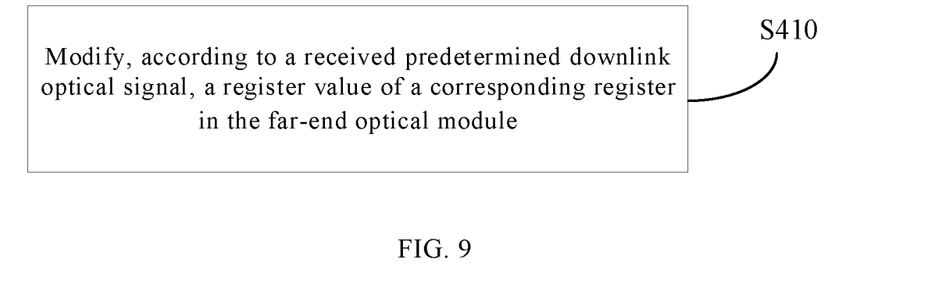
FIG. 9 is a flowchart of an implementation of a control method according to the present disclosure.

As a fourth aspect of the present disclosure, there is provided a method for controlling an optical module of a far-end node. As shown in FIG. 9, the method may include operation S410.

At operation S410, a register value of a corresponding register in the far-end optical module is modified according to a received predetermined downlink optical signal. The predetermined downlink optical signal is a downlink optical signal sent from a near-end optical module of a near-end node according to the method for transmitting control parameters of the third aspect of the present disclosure, and register values of the registers of the far-end optical module have a mapping relationship with control parameters of the far-end optical module.

After the register value of the corresponding register in the far-end optical module is modified, the far-end optical module can execute the specific operation according to the modified register value.

According to the method for controlling the far-end optical module of the far-end node of the present disclosure, the register value of the corresponding register in the far-end optical module is modified according to the register value and the ID information of the register transmitted from the near-end optical module, and then the optical module of the far-end node can execute the specific operation by reading the control parameters stored in the register, thereby implementing remote control on the optical module of the far-end node through the optical module of the near-end node.

Figure 10:
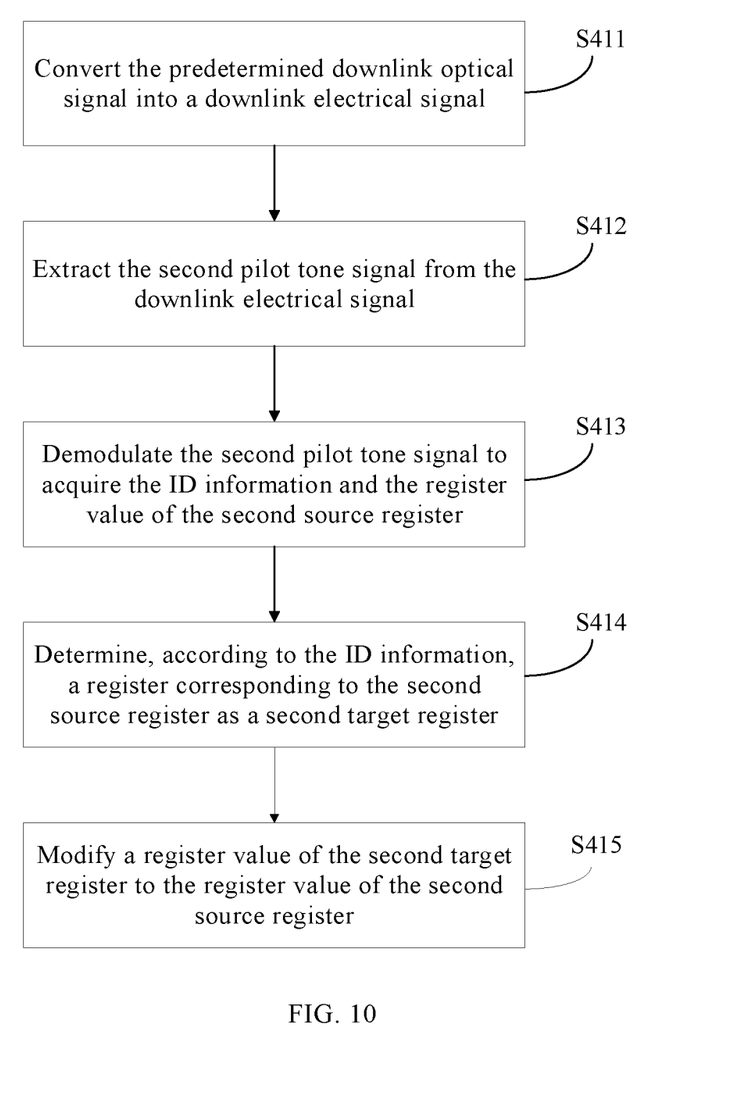
FIG. 10 is a flowchart of another implementation of a control method according to the present disclosure.

As an optional implementation, as shown in FIG. 10, operation S410 further includes operations S411 to S415.

At operation S411, the predetermined downlink optical signal is converted into a downlink electrical signal.

At operation S412, the second pilot tone signal is extracted from the downlink electrical signal.

At operation S413, the second pilot tone signal is demodulated to acquire the ID information and the register value of the second source register.

At operation S414, a register corresponding to the second source register is determined according to the ID information as a second target register.

At operation S415, a register value of the second target register is modified to the register value of the second source register.

Figure 11:
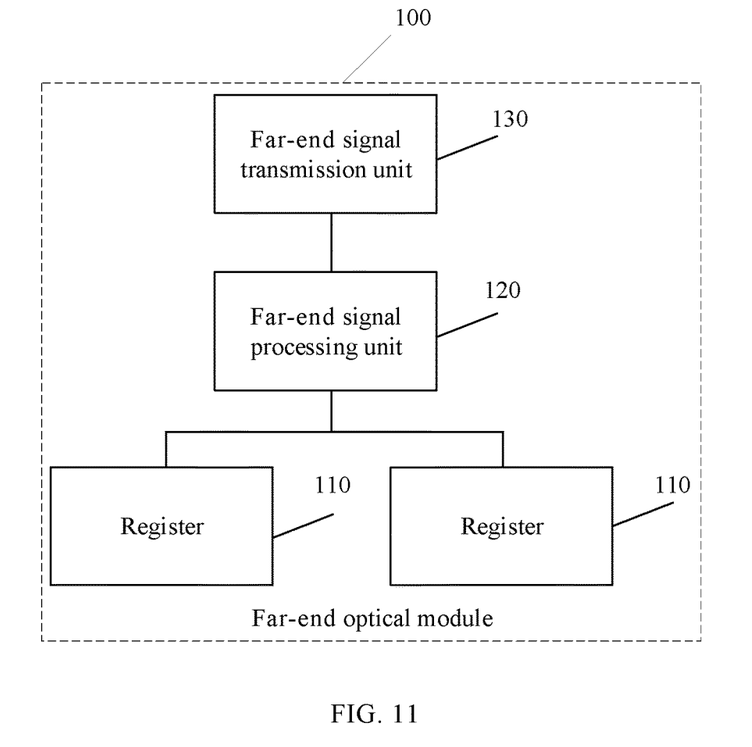
FIG. 11 is a block diagram of an implementation of a far-end optical module according to the present disclosure.

As a fifth aspect of the present disclosure, there is provided a far-end optical module 100 which, as shown in FIG. 11, includes: a plurality of registers 110 configured to store respective performance parameters of the far-end optical module; a far-end signal processing unit 120 configured to generate, when at least one of the plurality of registers becomes a first source register, an uplink optical signal according to ID information and a register value of the first source register, where the first source register is a register having a changed register value of the plurality of registers; and a far-end signal transmission unit 130 configured to transmit the uplink optical signal to a near-end optical module of a near-end node. The far-end signal transmission unit 130 may be, for example, an optical component.

Figure 13:
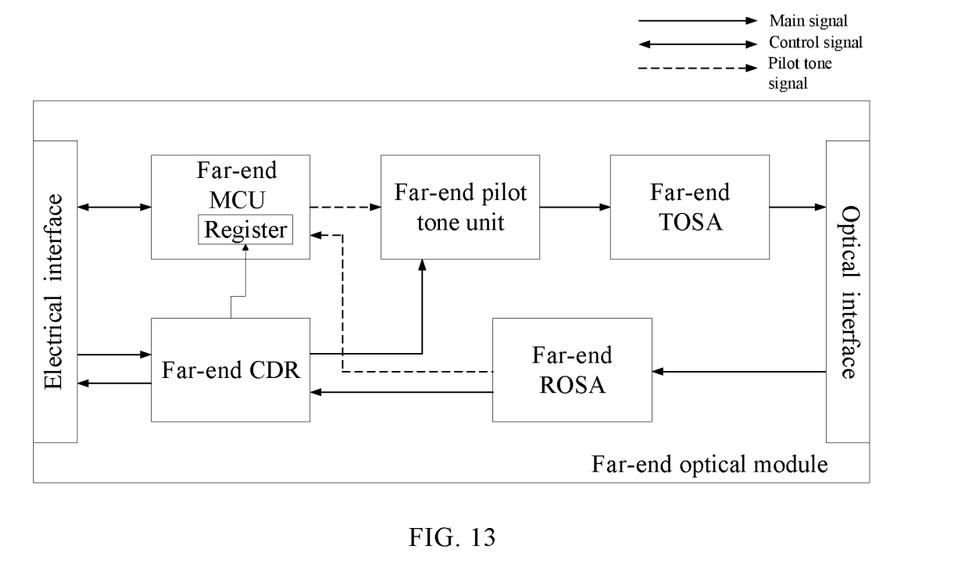
FIG. 13 is a schematic diagram of another implementation of a far-end optical module according to the present disclosure.

As an optional implementation, as shown in FIG. 13, the far-end signal processing unit 120 includes a far-end micro control unit (MCU), a far-end pilot tone unit (such as a digital signal processing circuit, a digital signal processor, or a pilot tone circuit), and a far-end transmitter optical subassembly (TOSA).

The far-end MCU is connected to the far-end pilot tone unit and configured to generate a first pilot tone signal according to the ID information and the register value of the first source register.

The far-end pilot tone unit is connected to the far-end TOSA and configured to perform pilot tone modulation on an uplink main signal of the far-end optical module according to the first pilot tone signal.

The far-end TOSA is configured to convert the uplink main signal after the pilot tone modulation into the uplink optical signal.

As an optional implementation, the far-end optical module can further execute a corresponding operation according to the control parameter transmitted from the near-end optical module to implement a specific function. Accordingly, the far-end signal processing unit 120 is further configured to modify, according to a received predetermined downlink optical signal, a register value of a corresponding register of the plurality of registers. The predetermined downlink optical signal is a downlink optical signal sent from a near-end optical module of a near-end node according to the method for transmitting control parameters of the third aspect of the present disclosure, and register values of the registers have a mapping relationship with control parameters of the far-end optical module.

As an optional implementation, as shown in FIG. 13, the far-end signal processing unit 120 further includes a far-end receiver optical subassembly (ROSA).

The far-end ROSA is connected to the far-end MCU and configured to convert the predetermined downlink optical signal into a downlink electrical signal, and extract a second pilot tone signal from the downlink electrical signal.

The far-end MCU is further configured to demodulate the second pilot tone signal to acquire ID information of a second source register and a register value of the second source register, determine, according to the ID information, a register corresponding to the second source register as a second target register, and modify a register value of the second target register to the register value of the second source register. A plurality of mapping registers in the mapping register set of the near-end optical module are in one-to-one correspondence with a plurality of registers in the far-end optical module, and the second source register is a mapping register having a changed register value of the plurality of mapping registers.

It should be noted that, as shown in FIG. 13, in the present disclosure, the far-end optical module further includes a far-end clock and data recovery (CDR) unit (such as a clock and data recovery circuit). The far-end CDR is connected to the far-end pilot tone unit and the far-end ROSA, and configured to perform symbol synchronization on a main signal input to the far-end optical module, that is, extract a clock signal from the main signal input to the far-end optical module and find out a correct phase relationship between the data and the clock. In addition, the far-end optical module further includes an optical interface and an electrical interface. The far-end optical module is connected to other components of the far-end node through the electrical interface, and interacts control signals and transmits main signals with other components of the far-end node through the electrical interface. The far-end optical module is connected to an optical fiber through the optical interface, and thus connected to the near-end optical module of the near-end node.

The far-end optical module according to the fifth aspect of the present disclosure is configured to execute the method for transmitting performance parameters according to the first aspect of the present disclosure and the control method according to the fourth aspect of the present disclosure; these methods have been described in detail above, and thus are not described in detail here.

Figure 12:
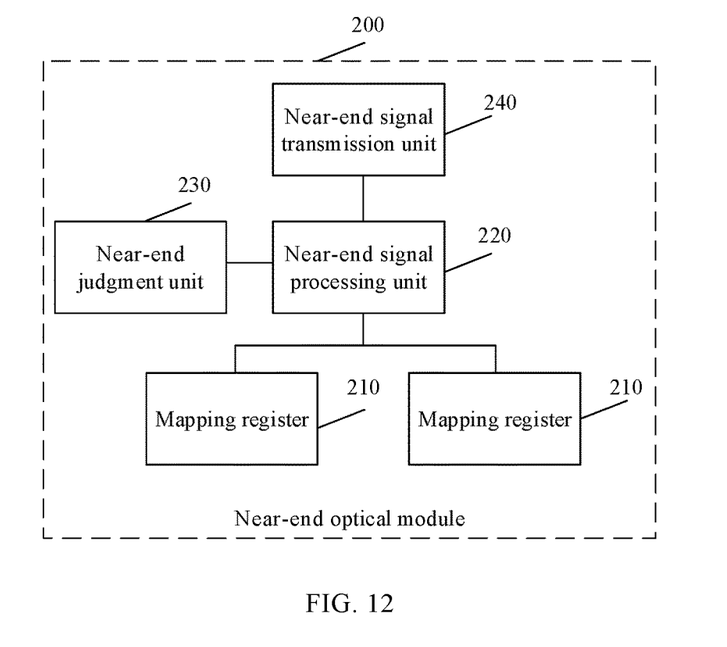
FIG. 12 is a block diagram of an implementation of a near-end optical module according to the present disclosure.

As a sixth aspect of the present disclosure, there is provided a near-end optical module 200 which, as shown in FIG. 12, includes: a plurality of mapping registers 210 in one-to-one correspondence with a plurality of registers of a far-end optical module; a near-end signal processing unit 220 configured to modify, according to a received predetermined uplink optical signal, a register value of a corresponding mapping register of a near-end optical module of a near-end node, where the predetermined uplink optical signal is an uplink optical signal sent from the far-end optical module of the far-end node according to the method for transmitting performance parameters of the first aspect of the present disclosure; and a near-end judgement unit 230 configured to determine, according to the modified register value of the mapping register, a running state of the far-end optical module. The near-end judgement unit 230 may be, for example, a microprocessor, a logic processor, a logic circuit, or the like.

Figure 14:
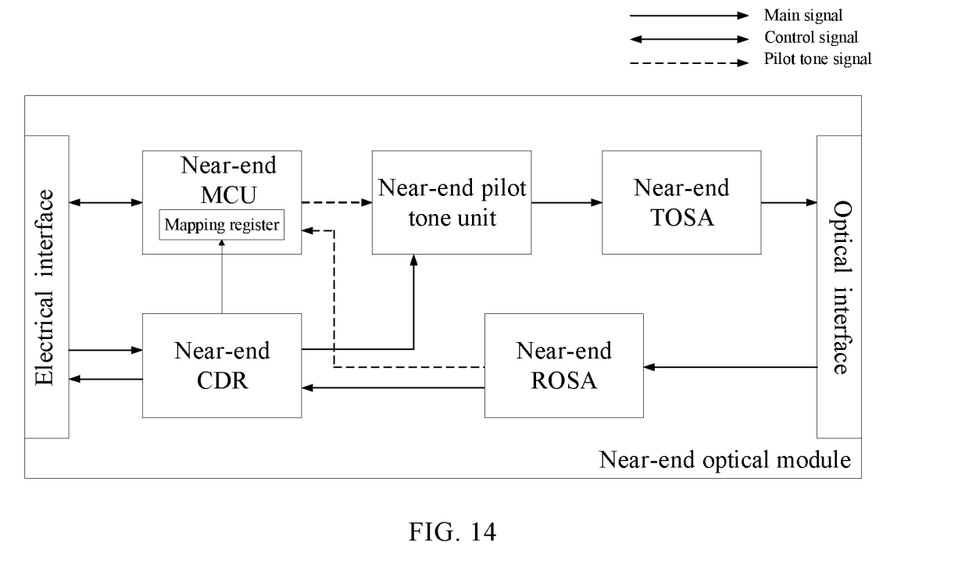
FIG. 14 is a schematic diagram of another implementation of a near-end optical module according to the present disclosure.

As an optional implementation, as shown in FIG. 14, the near-end signal processing unit 220 includes a near-end MCU, and a near-end ROSA.

The near-end ROSA is connected to the near-end MCU and configured to convert the predetermined uplink optical signal into an uplink electrical signal, and extract the first pilot tone signal from the uplink electrical signal.

The near-end MCU is configured to demodulate the first pilot tone signal to acquire ID information and a register value of a first source register, determine, according to the ID information, a mapping register corresponding to the first source register as a first target register, and modify a register value of the first target register to the register value of the corresponding first source register. The first source register is a register having a changed register value of the plurality of registers of the far-end optical module.

As an optional implementation, the near-end optical module can further transmit a control parameter to the far-end optical module of the far-end node to implement remote control on the far-end optical module. Accordingly, as shown in FIG. 12, the near-end optical module 200 further includes a near-end signal transmission unit 240. The near-end signal transmission unit 240 may be, for example, an optical component.

The near-end signal processing unit 220 is further configured to generate, when at least one of the mapping registers becomes a second source register, a downlink optical signal according to ID information and a register value of the second source register. The second source register is a mapping register having a changed register value of the plurality of mapping registers, and register values of the mapping registers have a mapping relationship with control parameters of the far-end optical module. The near-end signal transmission unit 240 is configured to transmit the downlink optical signal to the far-end optical module.

As an optional implementation, as shown in FIG. 14, the near-end signal processing unit further includes a near-end pilot tone unit, and a near-end TOSA. The near-end pilot tone unit may be, for example, a digital signal processing circuit, a digital signal processor, a pilot tone circuit, or the like.

The near-end MCU is further configured to generate a second pilot tone signal according to the ID information and the register value of the second source register.

The near-end pilot tone unit is connected to the near-end MCU and configured to perform pilot tone modulation on a downlink main signal of the near-end optical module according to the second pilot tone signal.

The near-end TOSA is connected to the near-end pilot tone unit and configured to convert the downlink main signal after the pilot tone modulation into the downlink optical signal.

It should be noted that, as shown in FIG. 14, in the present disclosure, the near-end optical module further includes a near-end CDR (e.g., a CDR circuit). The near-end CDR is connected to the near-end pilot tone unit and the near-end ROSA, and configured to perform symbol synchronization on a main signal input to the near-end optical module, that is, extract a clock signal from the main signal input to the near-end optical module and find out a correct phase relationship between the data and the clock. In addition, the near-end optical module further includes an optical interface and an electrical interface. The near-end optical module is connected to other components of the near-end node through the electrical interface, and interacts control signals and transmits main signals with other components of the near-end node through the electrical interface. The near-end optical module is connected to an optical fiber through the optical interface, and thus connected to the far-end optical module of the far-end node.

The near-end optical module according to the sixth aspect of the present disclosure is configured to execute the detection method according to the second aspect of the present disclosure and the method for transmitting control parameters according to the third aspect of the present disclosure; these methods have been described in detail above, and thus are not described in detail here.

As a seventh aspect of the present disclosure, there is provided a fronthaul system including a near-end node and a far-end node. The near-end node includes the near-end optical module according to the sixth aspect of the present disclosure, and the far-end node includes the far-end optical module according to the fifth aspect of the present disclosure.

Figure 15:
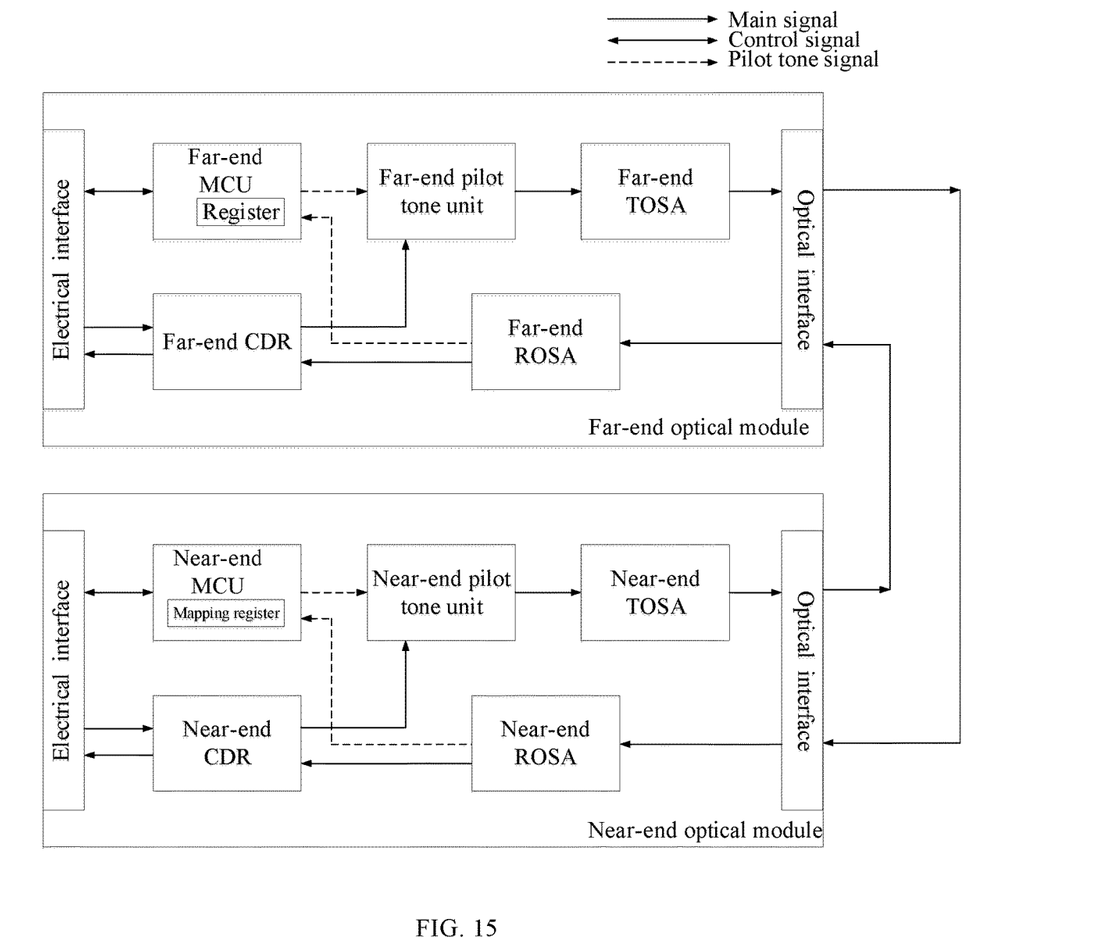
FIG. 15 is a schematic diagram of an implementation of a fronthaul system according to the present disclosure.

FIG. 15 shows a schematic diagram of an implementation of a fronthaul system according to the seventh aspect of the present disclosure. As shown in FIG. 15, in the fronthaul system, the near-end TOSA of the near-end optical module is connected to the far-end ROSA of the far-end optical module through an optical fiber, and the near-end ROSA of the near-end optical module is connected to the far-end TOSA of the far-end optical module.

According to the present disclosure, the near-end optical module includes a plurality of mapping registers in one-to-one correspondence with a plurality of registers of a far-end optical module, and when the register value of at least one mapping register in the near-end optical module changes, the register value of the corresponding register in the far-end optical module is modified synchronously, thereby implementing remote control on the far-end optical module of the far-end node through the near-end node. When the register value of at least one register in the far-end optical module changes, the register value of the corresponding mapping register in the near-end optical module is modified synchronously, thereby implementing performance monitoring of the far-end optical module of the far-end node through the near-end node.

It will be appreciated that the above implementations are merely exemplary implementations for the purpose of illustrating the principle of the disclosure, and the disclosure is not limited thereto. It will be apparent to one of ordinary skill in the art that various modifications and variations can be made to the present disclosure without departing from the spirit or essence of the present disclosure. Such modifications and variations should also be considered as falling into the protection scope of the present disclosure.

What is claimed is:

1. A method for transmitting performance parameters of a far-end optical module of a far-end node, comprising:
generating, in response to at least one of a plurality of registers of the far-end optical module becoming a first source register, an uplink optical signal according to ID information of the first source register and a register value of the first source register, wherein the first source register is a register having a changed register value of the plurality of registers, and register values of the plurality of registers have a mapping relationship with performance parameters of the far-end optical module; and transmitting the uplink optical signal to a near-end optical module of a near-end node, wherein the uplink optical signal is used for modifying a register value of a corresponding mapping register of the near-end optical module, wherein the ID information of the first source register and the register value of the first source register are carried in the uplink optical signal, and the register value of the first source register is used for indicating a performance parameter of the far-end optical module.

2. The method for transmitting performance parameters according to claim 1, wherein generating the uplink optical signal according to the ID information of the first source register and the register value of the first source register comprises:

generating a first pilot tone signal according to the ID information of the first source register and the register value of the first source register;

performing pilot tone modulation on an uplink main signal of the far-end optical module according to the first pilot tone signal; and converting the uplink main signal after the pilot tone modulation into the uplink optical signal.

3. A detection method for detecting performance of a far-end optical module of a far-end node, comprising:

modifying, according to a received predetermined uplink optical signal, a register value of a corresponding mapping register in a mapping register set of a near-end optical module of a near-end node, wherein the predetermined uplink optical signal is an uplink optical signal sent from the far-end optical module of the far-end node according to the method for transmitting performance parameters of claim 1, the mapping register set comprises a plurality of mapping registers, and the plurality of mapping registers are in one-to-one correspondence with the plurality of registers of the far-end optical module; and determining, according to the modified register value of the mapping register, a running state of the far-end optical module.

4. The detection method according to claim 3, wherein the far-end optical module generates the uplink optical signal by:

generating a first pilot tone signal according to the ID information and the register value of the first source register;

performing pilot tone modulation on an uplink main signal of the far-end optical module according to the first pilot tone signal; and converting the uplink main signal after the pilot tone modulation into the uplink optical signal; and modifying, according to the received predetermined uplink optical signal, the register value of the corresponding mapping register in the mapping register set of the near-end optical module of the near-end node comprises:

converting the predetermined uplink optical signal into an uplink electrical signal;

extracting the first pilot tone signal from the uplink electrical signal;

demodulating the first pilot tone signal to acquire the ID information and the register value of the first source register;

determining, according to the ID information, a mapping register corresponding to the first source register as a first target register; and modifying a register value of the first target register to the register value of the corresponding first source register.

5. A near-end optical module, comprising:

a plurality of mapping registers in one-to-one correspondence with a plurality of registers of a far-end optical module;

a near-end signal processing unit configured to modify, according to a received predetermined uplink optical signal, a register value of a corresponding mapping register of the near-end optical module of a near-end node, wherein the predetermined uplink optical signal is an uplink optical signal sent from the far-end optical module of a far-end node according to the method for transmitting performance parameters of claim 1; and a near-end judgement unit configured to determine, according to the modified register value of the mapping register, a running state of the far-end optical module.

6. The near-end optical module according to claim 5, wherein the near-end signal processing unit comprises a near-end MCU, and a near-end ROSA;

the near-end ROSA is connected to the near-end MCU and configured to convert the predetermined uplink optical signal into an uplink electrical signal, and extract a first pilot tone signal from the uplink electrical signal;

the near-end MCU is configured to demodulate the first pilot tone signal to acquire the ID information and the register value of the first source register, determine, according to the ID information, a mapping register corresponding to the first source register as a first target register, and modify a register value of the first target register to the register value of the corresponding first source register.

7. The near-end optical module according to claim 6, wherein the near-end optical module further comprises a near-end signal transmission unit;

the near-end signal processing unit is further configured to generate, in response to at least one of the plurality of mapping registers becoming a second source register, a downlink optical signal according to ID information and a register value of the second source register, wherein the second source register is a mapping register having a changed register value of the plurality of mapping registers, and register values of the plurality of mapping registers have a mapping relationship with control parameters of the far-end optical module; and the near-end signal transmission unit is configured to transmit the downlink optical signal to the far-end optical module.

8. The near-end optical module according to claim 7, wherein the near-end signal processing unit further comprises a near-end pilot tone unit, and a near-end TOSA;

the near-end MCU is further configured to generate a second pilot tone signal according to the ID information and the register value of the second source register;

the near-end pilot tone unit is connected to the near-end MCU and configured to perform pilot tone modulation on a downlink main signal of the near-end optical module according to the second pilot tone signal; and the near-end TOSA is connected to the near-end pilot tone unit and configured to convert the downlink main signal after the pilot tone modulation into the downlink optical signal.

9. A fronthaul system comprising a near-end node and a far-end node, wherein the near-end node comprises the near-end optical module according to claim 5, and the far-end node comprises a far-end optical module comprising: a plurality of registers configured to store respective performance parameters of the far-end optical module;
- a far-end signal processing unit configured to generate, in response to at least one of the plurality of registers becoming a first source register, an uplink optical signal according to ID information and a register value of the first source register, wherein the first source register is a register having a changed register value of the plurality of registers; and
- a far-end signal transmission unit configured to transmit the uplink optical signal to the near-end optical module of the near-end node.

10. A far-end optical module, comprising:
- a plurality of registers configured to store respective performance parameters of the far-end optical module;
- a far-end signal processing unit configured to generate, in response to at least one of the plurality of registers becoming a first source register, an uplink optical signal according to ID information and a register value of the first source register, wherein the first source register is a register having a changed register value of the plurality of registers; and
- a far-end signal transmission unit configured to transmit the uplink optical signal to a near-end optical module of a near-end node, wherein the uplink optical signal is used for modifying a register value of a corresponding mapping register of the near-end optical module,
- wherein the ID information of the first source register and the register value of the first source register are carried in the uplink optical signal, and the register value of the first source register is used for indicating a performance parameter of the far-end optical module.

11. The far-end optical module according to claim 10, wherein the far-end signal processing unit comprises a far-end micro control unit (MCU), a far-end pilot tone unit, and a far-end transmitter optical subassembly (TOSA);
- the far-end MCU is connected to the far-end pilot tone unit and configured to generate a first pilot tone signal according to the ID information and the register value of the first source register;
- the far-end pilot tone unit is connected to the far-end TOSA and configured to perform pilot tone modulation on an uplink main signal of the far-end optical module according to the first pilot tone signal; and
- the far-end TOSA is configured to convert the uplink main signal after the pilot tone modulation into the uplink optical signal.

12. The far-end optical module according to claim 11, wherein
- the far-end signal processing unit is further configured to modify, according to a received predetermined downlink optical signal, a register value of a corresponding register of the plurality of registers, wherein the predetermined downlink optical signal is a downlink optical signal sent from a near-end optical module of a near-end node by:
- generating, in response to at least one mapping register in a mapping register set of the near-end optical module of the near-end node becoming a second source register, the downlink optical signal according to ID information and a register value of the second source register, wherein a plurality of mapping registers in the mapping register set are in one-to-one correspondence with the plurality of registers in the far-end optical module of the far-end node, the second source register is a mapping register having a changed register value of the plurality of mapping registers, and register values of the plurality of mapping registers have a mapping relationship with control parameters of the far-end optical module; and
- transmitting the downlink optical signal to the far-end optical module.

13. The far-end optical module according to claim 12, wherein the far-end signal processing unit further comprises a far-end receiver optical subassembly (ROSA);
- the far-end ROSA is connected to the far-end MCU and configured to convert the predetermined downlink optical signal into a downlink electrical signal, and extract a second pilot tone signal from the downlink electrical signal;
- the far-end MCU is further configured to demodulate the second pilot tone signal to acquire the ID information of the second source register and the register value of the second source register, determine, according to the ID information, a register corresponding to the second source register as a second target register, and modify a register value of the second target register to the register value of the second source register.

* * * * *